United States Patent [19]
Freeman

[11] Patent Number: 5,820,230
[45] Date of Patent: Oct. 13, 1998

[54] YIELDABLE DEBRIS CUTTER

[76] Inventor: Ernie Freeman, 3467 Kings Mill Run, Rocky River, Ohio 44116

[21] Appl. No.: 883,894

[22] Filed: Jun. 27, 1997

[51] Int. Cl.$^6$ .................................................. B62D 55/088
[52] U.S. Cl. ............................................ 305/107; 305/110
[58] Field of Search ................................... 305/100, 107, 305/109, 110, 115; 172/558, 559, 561, 566; 404/129; 403/2; 411/2, 4

[56] References Cited

U.S. PATENT DOCUMENTS

| | | | |
|---|---|---|---|
| 4,818,040 | 4/1989 | Mezzancella et al. | 305/110 X |
| 5,370,451 | 12/1994 | Brownlee et al. | 305/100 X |
| 5,697,683 | 12/1997 | Arulandu et al. | 305/107 X |
| 5,725,292 | 3/1998 | Keedy et al. | 305/110 |

*Primary Examiner*—Russell D. Stormer
*Attorney, Agent, or Firm*—Pearne, Gordon, McCoy & Granger LLP

[57] ABSTRACT

Several embodiments of yieldable cutter blades are disclosed for use on a land vehicle to reduce the tendency of debris from being entrained and wrapped on rotary parts and their supports such as on wheels and axles or drive sprocket hubs and associated support housings. The blades yield in response to an excessive cutting force which could potentially damage support bearings for the rotary part in extraordinary conditions. In the various embodiments, a yieldable blade is retained in its operating position by a set of bolts of predetermined strength. When an excessive cutting force occurs, the bolts break away and permit the blade to yield away from its operative cutting position.

4 Claims, 6 Drawing Sheets

YIELDABLE DEBRIS CUTTER

The invention relates to improvements in land vehicles that have external rotary elements associated with their ground engaging support members and, more specifically, to apparatus for reducing the tendency of materials to wrap around such rotary elements.

BACKGROUND OF THE INVENTION

Off-road equipment and, in particular, equipment used in transfer stations and landfills to transfer, move and/or compact refuse is prone to accumulate debris on chassis parts that support rotating elements such as wheels or track drive sprockets. This accumulation of debris can result in excessive wear on both external parts and on internal drive components as well as unnecessary fuel consumption. My U.S. Pat. Nos. 5,330,260, 5,451,100, 5,553,932, and 5,713,644 disclose cutter blade apparatus that prevents the excessive accumulation of debris on axles and drive sprocket hubs of wheel and/or track supported vehicles. This type of apparatus has proven its effectiveness after years of use in the waste industry. Under extraordinary conditions such as where an unusually strong object would find its way to the shear point between cutter blades with certain equipment, some observers have expressed a concern that the forces developed by the cutter blades may reach a level that could be detrimental to the bearings supporting the rotating parts associated with the cutters.

SUMMARY OF THE INVENTION

The invention provides an arrangement for vehicles of the described type that limits the force levels that can be developed between a pair of cutter blades. The invention thus protects the bearings of the associated rotating parts in extraordinary circumstances such as where an unusually strong object finds its way to the shear point between the blades. In accordance with the invention, one of the blades of a set is mounted on the vehicle with a yieldable element that is constructed to allow this blade to move away from its normal operating position when excessive forces are encountered.

In the illustrated embodiments, the yieldable element is in the form of at least one fracturable threaded fastener that secures the associated blade in its normal operating position. When the fastener is subjected to a blade cutting force that approaches a level that could be detrimental to the relevant bearing, it breaks away and allows the blade to move out of a cutting position and thereby releases the cutting force. More specifically, the threaded fastener member is arranged to hold the blade by tensile forces in the member and the release action is achieved when the ultimate tensile strength of the member is reached.

DESCRIPTION OF THE PREFERRED EMBODIMENTS

The disclosures of U.S. Pat. Nos. 5,330,260, 5,451,100, 5,553,932, and 5,713,644 are incorporated in their entireties herein by reference.

Figure 1:
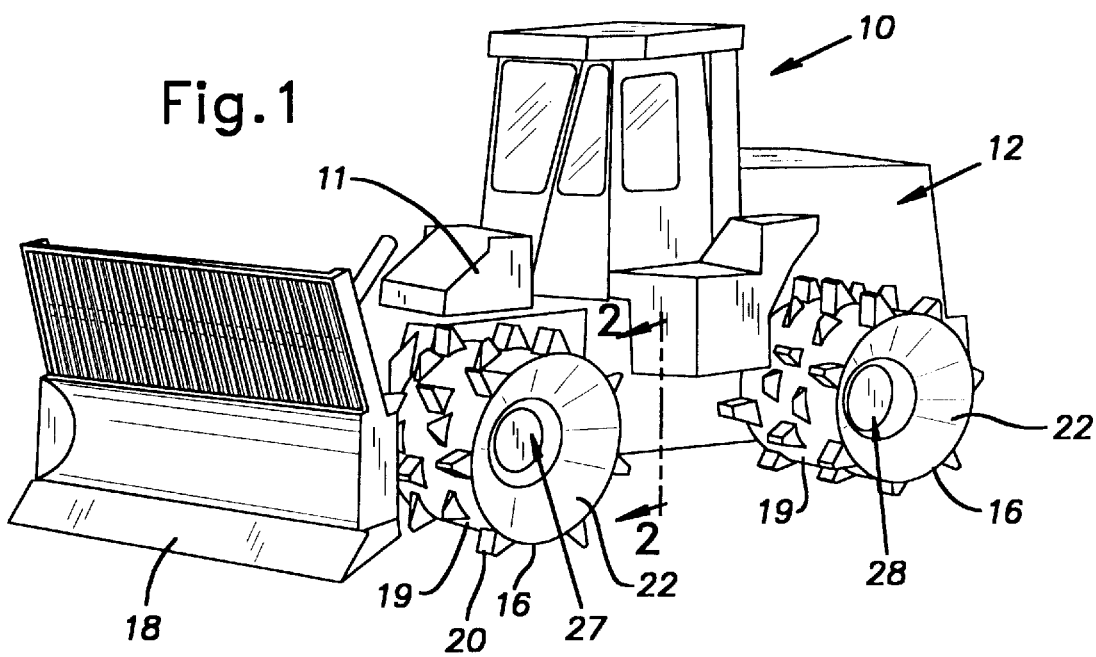
FIG. 1 is a perspective view of a refuse compactor employing the present invention.
Figure 2:
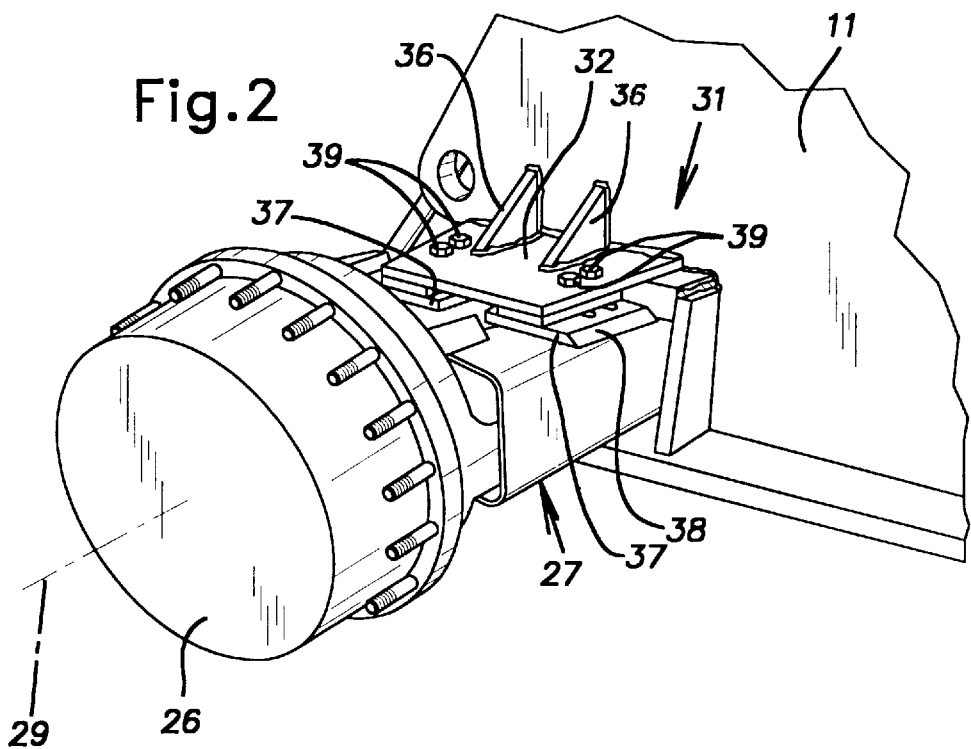
FIG. 2 is a perspective view of a portion of the left front axle and associated yieldable cutter blade assembly in accordance with a first embodiment of the invention taken from the view generally indicated by the reference arrows 2—2 in FIG. 1.
Figure 3:
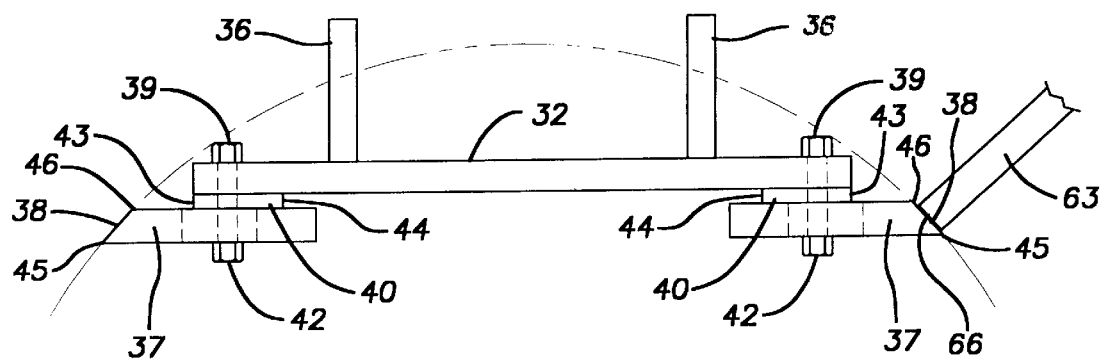
FIG. 3 is a fragmentary somewhat schematic side elevational view of the yieldable stationary cutter blades shown in FIG. 2.

A large self-propelled four-wheeled tractor 10 illustrated in FIG. 1 is known in the landfill industry as a compactor. Commonly known examples of such tractors are machines marketed by Caterpillar, Inc. under the model designations CAT 826C; CAT 816B and CAT 836. The compactor 10 includes a chassis 11 on which is carried an engine and drive train generally indicated at 12 that propel the front and rear wheels 16 selectively for either forward or backward rotation. An adjustable blade 18 at the front of the compactor chassis 11 is used to distribute refuse in a landfill while the wheels 16 compact the same as the compactor 10 rolls back and forth over the landfill area being filled. Typically, the wheels 16 are large diameter steel weldments.

A wheel 16 includes an outer cylindrical rim or thread 19 on which are fixed a multitude of projecting teeth 20 that tend to cut and otherwise disintegrate the refuse being compacted. The center of a wheel 16 is comprised of a pair of truncated steel cones 21, 22 at the inboard and outboard wheel sides, respectively. The center cones 21, 22 are arranged so that each face of the wheel is concave. The outer peripheries of the cones, 21, 22 are welded to the thread cylinder and the inner peripheries are welded to a cylindrical tubular hub 23. A mounting flange 24 on the inner periphery of the hub 23 has a series of spaced holes for mounting the wheel 16 to a final drive unit 26 of a respective axle 27 or 28. The front axle is shown at 27 and its wheel and axle axis is shown at 29.

In accordance with the invention, a cutter blade assembly 31 is installed on the chassis 11 in fixed relation to the associated front axle 27. In the illustrated case, the front axle 27 is rigidly fixed to the chassis or frame 11. The cutter blade assembly or structure 31 includes a weldment of heavy flat steel plate 32 of, for example, 1½ hot rolled steel on larger machines and proportionately thinner on smaller machines. The plate 32 and gusset reinforcing plates 36 are, in the illustrated case, welded directly to the chassis frame 11 and are spaced from the axle axis 29.

A pair of oppositely facing cutter blades 37 of the assembly 31 are supported by the plate 32. In the illustrated case, the blades 37 are disposed on a lower face of the plate or support 32. The blades are formed of steel sheet or bar of suitable thickness of about, for example 1½ inch thickness. The blades 37 each include a cutting edge 38 lying in a plane that is generally tangent to the path of a cooperating blade described below carried on an associated wheel 16. The cutting edge can have a length of about 6 inches for example. In accordance with the invention, each blade 37 is retained on the support plate 32 by a pair of bolts 39 of predetermined strength. A rigid steel block 40 is interposed between a blade 37 and the support plate 32. The block 40 preferably has a length approximately equal to the length of the blade 37 measured along the cutting edge 38. The bolts 39 are assembled through suitable holes or slots in the blade 37, block 40 and support plate 32 and are retained by threaded nuts 42. Preferably, the bolts 39 for each blade 37 are parallel and lie in a common vertical plane parallel to the associated cutting edge 38.

The locations of the edges 43, 44 of the block 40 are selected such that the associated blade 37 is supported in a manner wherein substantially the same tensile load is applied to the bolts 39 for an upward vertical cutting or shearing force applied on a cutting edge line 45 or for a downward cutting force applied to a cutting edge line 46.

Figure 4:
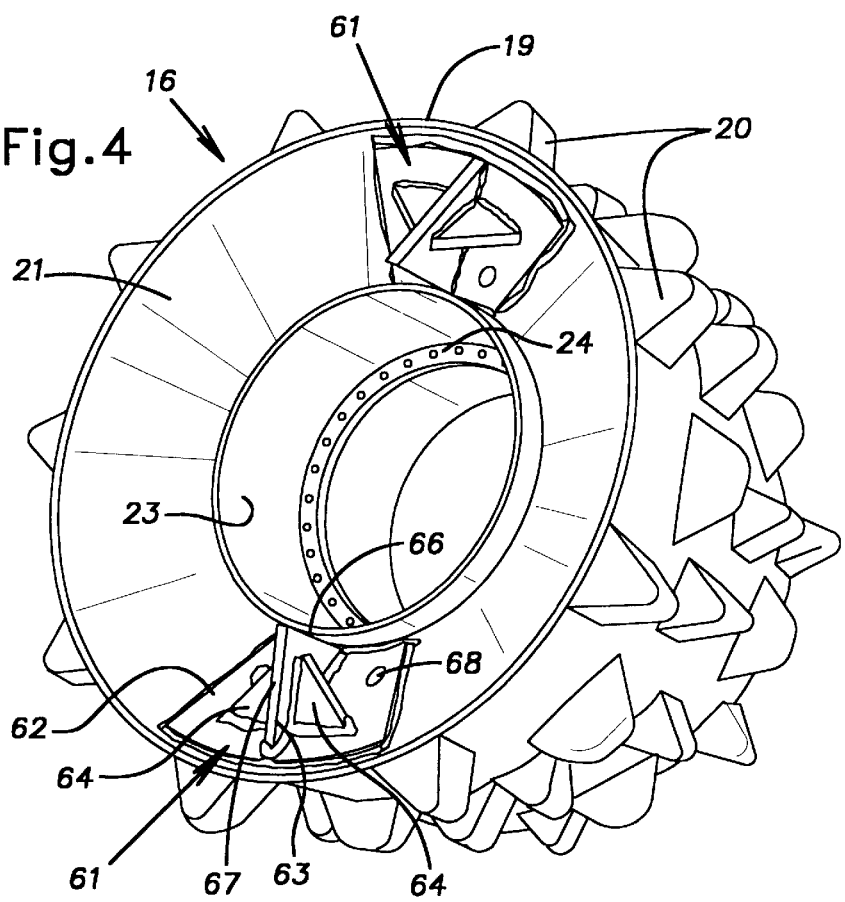
FIG. 4 is a perspective view of an inside face of a typical wheel used with the yieldable stationary blade assembly of FIGS. 2 and 3.

FIG. 4 shows the inside face of a typical wheel 16 in perspective. A wheel cutter blade assembly 61 is fixed to the inboard wheel center or cone 21 as by welding. The cutter blade assembly 61 is a heavy steel plate weldment of hot rolled steel and includes a mounting base plate 62 of, for example, ⅝ inch thickness, a cutter plate or blade 63 of for example about 1½ inch thickness (on larger machines), and a pair of triangular gussets 64 of one inch or ¾ inch thicknesses on opposite sides of the cutter plate 63 bracing the cutter plate against deflection out of its plane. The mounting base plate 62 preferably has a geometry that is complementary to the exposed surface of the center cone 21 such that it has a surface that has a conical configuration which is essentially the same as the exposed surface of the center cone. The cutter plate 63 includes a cutting edge 66 that is parallel and spaced from the axis of the wheel which when installed is coincident with the axis of the axles 27 and 28.

The cutter blade assembly 61 is fixed to the wheel 16 by welding the periphery of the mounting base plate 62 to the center cone 21 and by plug welding through preformed holes in the mounting base at points designated by the numeral 68. The dimensions of the mounting base 62 in its plane perpendicular to the cutting plate 63 are of the same order of magnitude as the major dimensions of the cutting plate to yield a rugged stable assembly with the wheel 16 when welded thereto as described. Preferably, with reference to this first embodiment, each of the wheels 16 are constructed in essentially the same manner and are fitted with cutter blade assemblies 61 that are essentially identical.

The cutter plate 63 is relatively large so that it presents its cutting edge 66 to the associated cutting edges 38 of the stationary cutter 31 at a considerable distance from the inner face of the wheel. This ensures that the debris will be cut efficiently without undue abrasion against the wheel. By way of example, on a relatively large machine where the wheel diameter is in the order of 60", the edge 66 can have a length of about 15 inches and the edge 67 can have a length of about 14½ inches. Although these edges can be reduced in length where the profile of the blade is trucanted.

The fixed cutter blade structure 31 is aligned with the associated wheel cutter blade or plate 63 at each front wheel such that these blades have substantially the same location along the axis of the respective axle 27. The various parts are proportioned so that there is a slight clearance of, for example, ⅛ between the respective cutting edges 38 and 66. As a wheel 16 turns, the wheel cutter blade 63 sweeps past the stationary cutter blade structure in a circular path about the axis 29 of the respective axle 27. When the movable wheel cutter blade 63 passes the stationary axle cutter blade structure 31, any refuse material entrained by a wheel 16 and tending to be wrapped about the axle is cut or sheared by the respective cutting edges or is at least scored by such edges if not fully severed. The cut or scored material is, consequently, unable to entwine itself around an axle and build-up in the wheel cavity formed by the center cone 21 of a wheel 16.

It will be understood that the force required to shear material between the fixed and rotating blades 37 and 63 is sustained by the bearing which rotationally supports the associated wheel 16. In accordance with the invention, the bolts 39 retaining a blade 37 in position on the support 32 are arranged to break when an unusually high cutting force is developed between it and the rotating cutting blade 63. When the bolts 39 break, the cutter blade 37 is allowed to yield away from the path of the rotating cutter blade 63 so as to limit the force imposed on the bearing assembly supporting the associated wheel 16. The tensile strength of the bolts 39 is predetermined by selecting a failure strength, based on the bolt material and cross-sectional area, depending on the geometries of the various parts below that which develops an excessive force on the wheel bearing.

In the illustrated embodiment of FIGS. 1 through 4, the support plate 32 has unthreaded through holes to receive the retaining bolts 39 and the bolts are secured by internally threaded nuts 42. Each cutter blade 37 can be provided with slots for receiving the bolts 39 such that the cutter blade can be adjusted in a direction with a radial component to account for wear. It is desirable to maintain only a relatively small clearance dimension between the blades of say ⅛ as previously mentioned.

Figure 5:
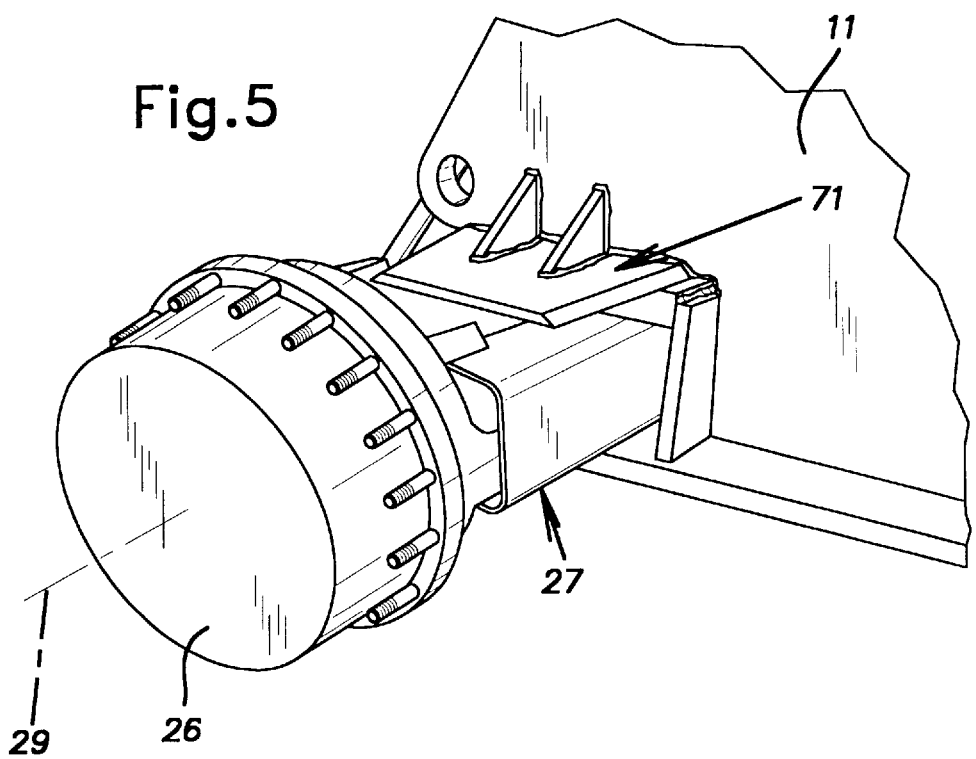
FIG. 5 illustrates a stationary cutter blade at the left front wheel in accordance with other embodiments of the invention.
Figure 6:
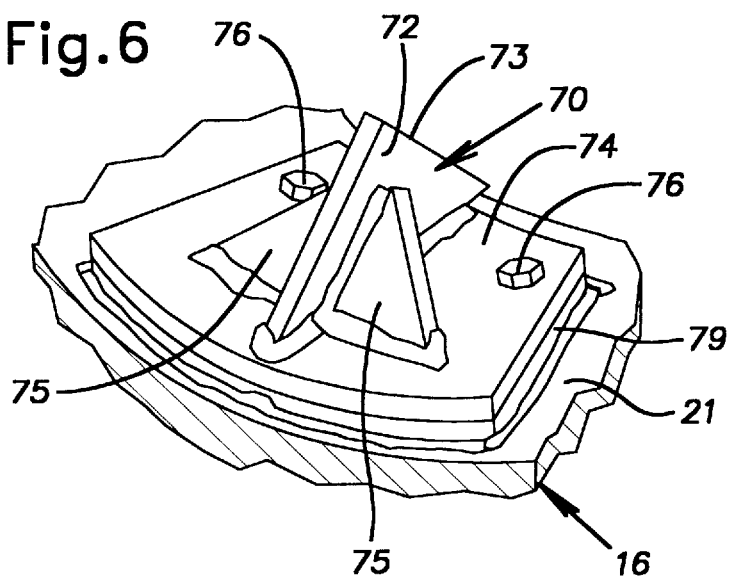
FIG. 6 is a fragmentary view of a wheel on which is mounted a yieldable cutter blade assembly for cooperation with the stationary cutter blade shown in FIG. 5 in accordance with a second embodiment of the invention.
Figure 7:
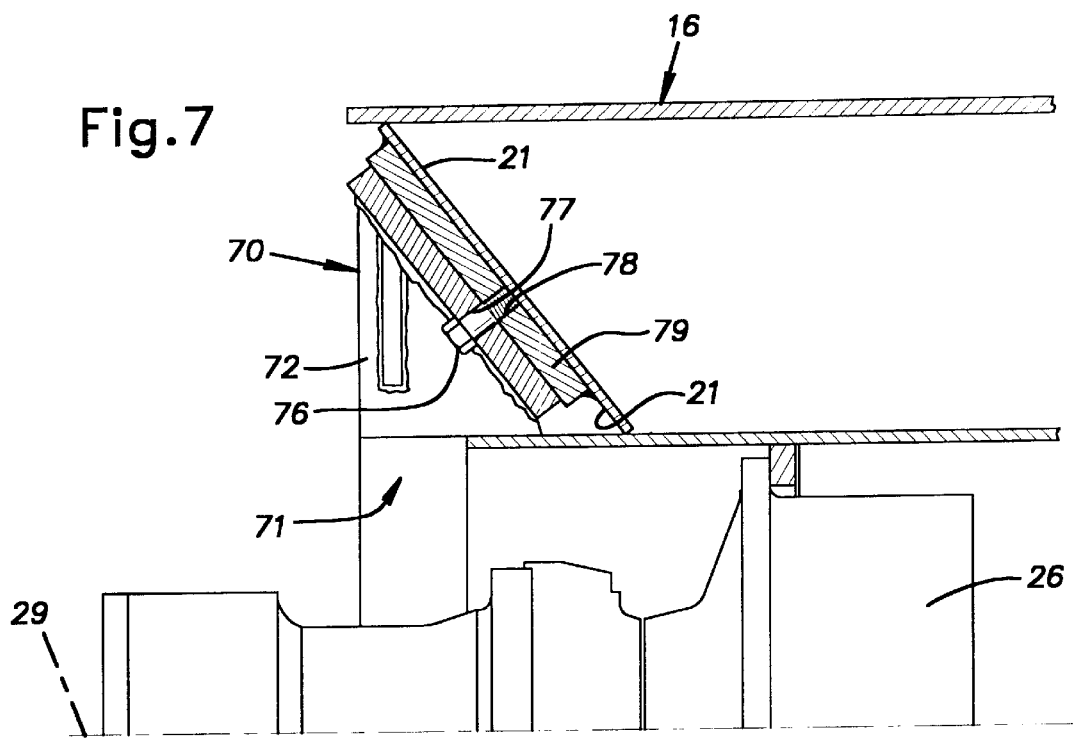
FIG. 7 illustrates the relationship of the stationary and wheel mounted rotating cutter blade assemblies when in a refuse cutting position.

FIGS. 5 through 7 illustrate another embodiment of the invention; like parts are identified with the same numerals referenced in FIGS. 1 through 4. In this construction, a cutter blade assembly 70 is mounted on the wheel 16 to rotate about the wheel axis 29 and to work with a stationary cutter blade assembly 71. The rotating cutter blade assembly 70 is arranged to yield out of its operating position, as discussed below, in the event of an excessive cutting force. The rotating cutter assembly 70 comprises a cutter plate or blade 72 that, when installed on the inner conical wheel face or cone 21 lies in a generally radial plane and presents a cutting edge 73 that is generally parallel to the wheel axis 29. The cutter plate 72 and a mounting base 74 are unitary with one another. The cutter plate 72 can be permanently joined to the mounting plate 74 by welding, for example. Alternatively, the plate and base can be integrally formed by casting, forging and/or machining. The base or mounting plate 74 extends generally in a plane perpendicular to the plane of the cutter blade or plate 72. The blade 72 can be stabilized with the mounting base plate 74 by reinforcing gussets 75. The rotating cutter blade assembly 70 preferably has overall proportions like those of the wheel mounted cutter blade assembly 61 described in connection with the embodiment of FIGS. 1 through 5. In normal conditions, the rotary cutter assembly 70 and stationary cutter assembly 71 work together in a manner like that described for the embodiment of FIGS. 1–4.

The rotating cutter blade assembly 70 is normally held in place on the wheel with a plurality of threaded fastening bolts 76. As shown in FIG. 7, the bolts 76 are received in holes or apertures 77 in the mounting plate and threaded into internally threaded holes 78 formed in mounting pads 79 welded or otherwise formed as a permanent part of the inside conical face 21 of the associated wheel 16. The apertures 77 and bolts 76 are situated on both sides of and spaced from the radial plane of the cutter plate or blade 72 in a pattern that is symmetrical with respect to the radial plane of the blade. The bolts 76 have their axes generally parallel to one another and to the plane of the blade. The bolts 76 by selection of their material and cross-sectional area are arranged to fail in tension in the event an excessive force on the cutter blade assemblies 70, 71 is developed to thereby release the rotating cutter blade assembly 70 from its normal operating position on its associated wheel 16 and prevent the bearing rotationally supporting the wheel from being overloaded.

Figure 8:
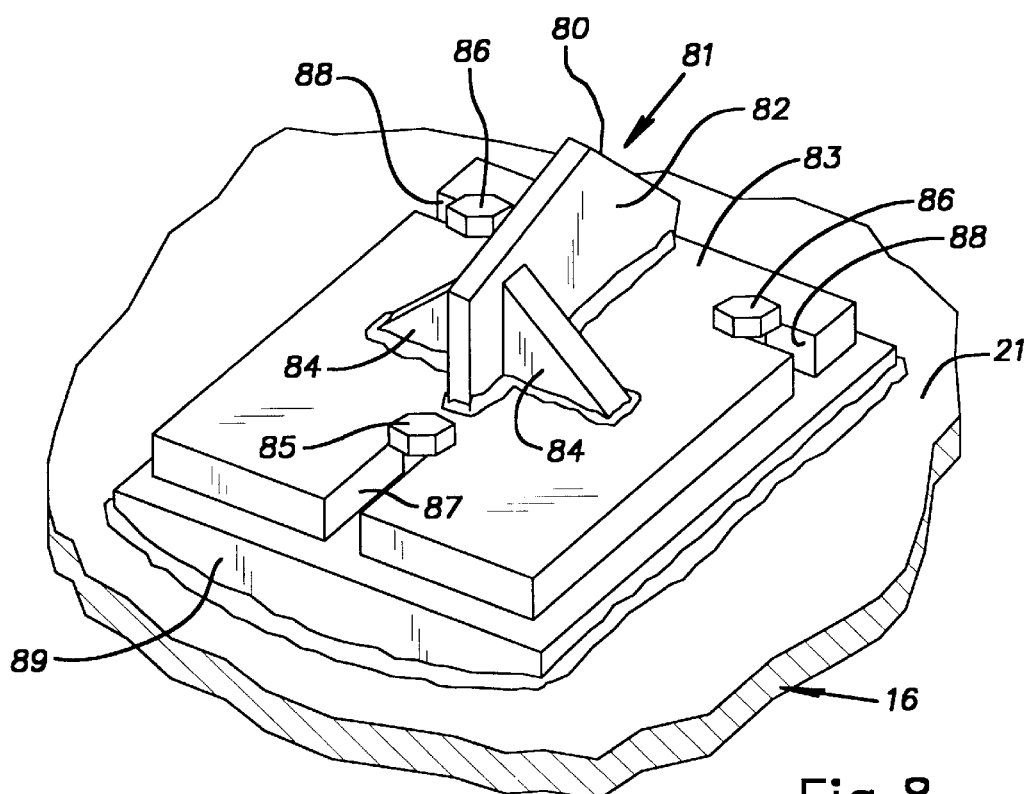
FIG. 8 is a fragmentary view of a wheel on which is mounted a yieldable cutter blade assembly in accordance with a third embodiment of the invention.

FIG. 8 illustrates another embodiment of the invention similar to the embodiment illustrated in FIGS. 5 through 7. A rotating cutter assembly 81 that works with a stationary cutter assembly such as shown in FIG. 5 includes a generally flat cutter plate or blade 82 with a cutting edge 80, welded or otherwise made unitary with a mounting or support plate 83. The mounting plate 83 lies in a plane generally perpendicular to the plane of the blade 82. Suitable reinforcing gussets 84 extend between the blade 82 and mounting plate 83 to rigidify these members. In this construction, the rotating or movable cutter assembly 81 is fixed to the wheel 16 by three threaded fasteners or bolts 85, 86. The mounting plate 83 has slots or apertures 87, 88 to receive the fasteners 85, 86 in a pattern that is symmetrical with respect to the radial plane of the blade 82. The fasteners 85, 86 with their axii parallel to the plane of the blade 82 are threaded into internally threaded holes in a mounting block or base 89, rigidly welded to the inside face 21 of the wheel 16. The retaining bolts 85, 86 are selected by appropriate material strength and cross-sectional area size to break away in the event an excessive cutting force is developed between the blades 82, 71 again to protect the bearing assembly of the associated wheel.

In the foregoing descriptions, the fixed or non-rotating blade assembly is associated with an axle rigidly fixed to the frame of the vehicle. Where an axle is articulated with respect to the frame, such as the rear axle, the fixed or non-rotating blade assembly is suitably rigidly fixed relative to the axle.

Figure 9:
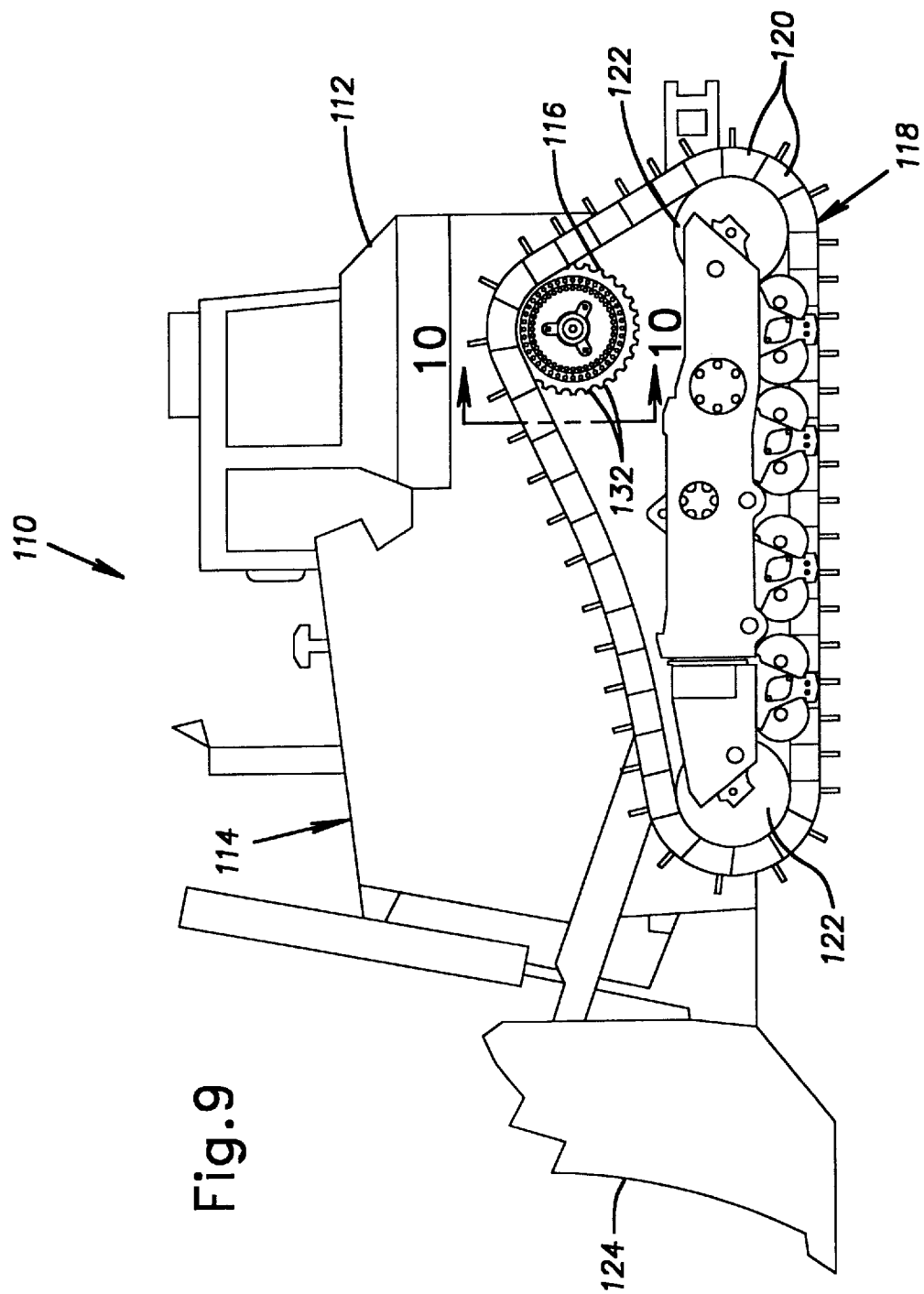
FIG. 9 is a schematic side view of a land vehicle in the form of an endless track supported tractor in a fourth embodiment of the invention.
Figure 10:
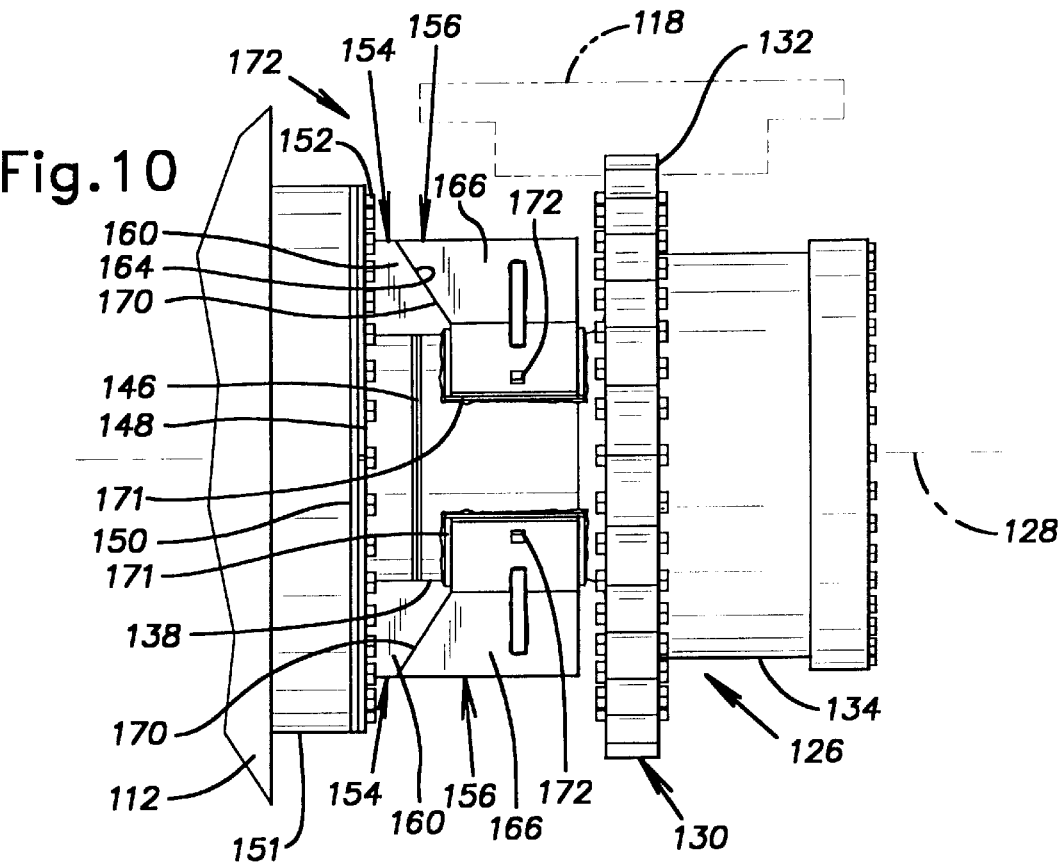
FIG. 10 is a view of a track drive sprocket and related chassis area of the tractor taken in the direction of the arrows 10—10 in FIG. 9.
Figure 11:
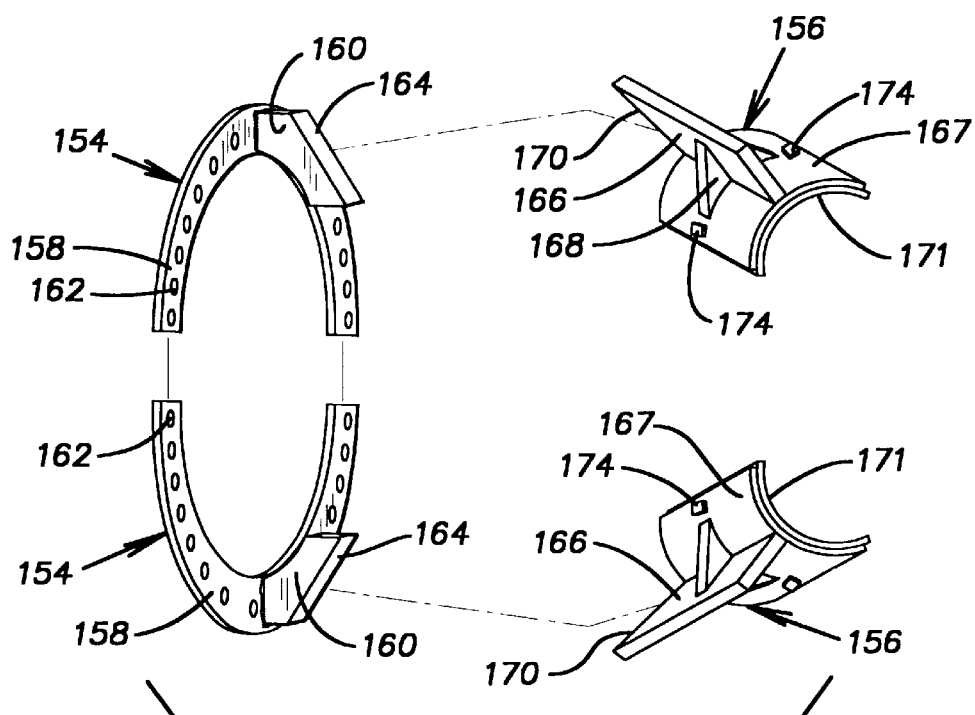
FIG. 11 is a schematic view illustrating the manner a rotating blade is yieldably attached to the drive sprocket hub.

FIGS. 9 through 11 illustrate still another embodiment of the present invention. A tractor 110 includes a chassis 112 on which is carried an engine and drive train generally indicated at 114. The engine and drive train 114 selectively propel a pair of sprocket drive assemblies 116 for either forward or backward rotation. One sprocket drive assembly 116 is located on the left side of the tractor 110 and the other sprocket drive assembly 116 is located on the right side of the tractor 110. The rotation of the sprocket drive assemblies 116 moves associated tracks 118 comprised of a plurality of track shoes 120 to propel the tractor 110. The sprocket drive assemblies 116 are located at an elevated position, that is, higher than track rollers 122 located near the portion of the track 118 engaging the ground. An adjustable blade 124 is provided at the front of the tractor 110 to distribute material such as the debris or refuse in a landfill as the tractor 110 moves back and forth over the landfill area being filled.

Each sprocket drive assembly 116 includes a hub 126 having a horizontal axis of rotation 128 and a sprocket 130. The sprocket 130 has a plurality of radially extending teeth 132 for engaging and moving the associated track 118 as the sprocket 130 is rotated. The hub 126 has cylindrical outer and inner portions 134, 138.

A duo-cone seal known in the industry has a plane of separation and relative rotation at 146 which provides a seal between the rotating hub 126 and the stationary chassis 112. The duo-cone seal includes cooperating hub and chassis sealing members 148, 150.

In accordance with the invention, a pair of chassis or stationary cutter blade assemblies 154 are installed on the chassis 112 in fixed relation to the associated sprocket drive assembly 116. Additionally, a pair of hub or rotating cutter blade assemblies 156 are installed on the sprocket drive assembly 116 in rotational relation to the associated chassis cutter blade assemblies 154. Preferably, each of the sprocket drive assemblies 116 are constructed in essentially the same manner and are fitted with chassis cutter blade assemblies 154 and hub cutter blade assemblies 156 that are essentially identical.

Each chassis cutter blade assembly 154 is a weldment of heavy flat steel plate and includes a mounting plate 158, of, for example, ⅝ inch or ¾ inch thickness and a cutting blade or plate 160 of, for example, 1½ inch thickness. The cutting plate 160 is substantially perpendicular to the mounting plate 158 and is welded to generally the center of the mounting plate 158. Alternatively, the cutting plate 160 could be welded directly to the chassis 112. The mounting plate 158 is sized and shaped for cooperating with at least a portion of the outer face of a mounting flange 151 of the chassis 112. Preferably, the mounting plate 158 is a segment of a circular ring that extends for approximately one-half the diameter of the mounting flange 151 so that the two mounting plates 158 extend around the entire diameter of the outer face of the mounting flange 151. The mounting plate 158 has a series of axially extending and circumferentially spaced holes 162 for receiving fasteners 152 of the mounting flange 151.

The cutting plate 160 is sized and shaped for extending axially outward from the chassis 112 and extends into a space or cavity formed between the sprocket 130 and the chassis 112. The cutting plate 160 has a geometry which is complementary with the exposed surface of the chassis 112, the duo-cone seal, and the hub inner portion 138. The cutting plate 160 includes a cutting edge 164 which is preferably at an angle to the axis of rotation 128 when installed. As best shown in FIG. 10, the cutting edge 164 is preferably at an oblique angle which extends generally toward an opening 172 formed between the chassis 112 and the track 118.

The chassis cutter blade assemblies 154 are attached to the chassis 112 by the fasteners 152 of the mounting flange 151 on the chassis 112. The fasteners 152 extend through the mounting plate 158 of the chassis cutter blade assembly 154 and into the mounting flange 151. The cutting plates 160 of the chassis cutter blade assemblies 154 are equally spaced about the outer periphery of the hub 126, that is, located about 180 degrees apart. Preferably, one of the cutting plates 160 is located above the hub 126 and the other one of the cutting plates 160 is located below the hub 126.

Each of the rotating hub cutter blade assemblies 156 is a heavy steel plate weldment of hot rolled steel and includes a cutter blade or plate 166 of, for example 1½ inch thickness, an arcuate cylindrical saddle base 167 of a wall thickness of for example 1 inch and a pair of gussets or straps 168 of, for example, ⅞ inch thickness. The straps 168 are welded to opposite sides of the cutter plate 166 for bracing the cutter plate on the base 167 against deflection out of its plane when installed. The cutter plate 166 includes a cutting edge 170 that is complementary to the cutting edge 164 of the chassis cutter blade assembly 154. Therefore the cutting edge 170 is preferably at an angle to the axis of rotation 128 when installed and, as best shown in FIG. 10, the cutting edge 170 is preferably at an oblique angle which extends generally toward the opening 172 formed between the chassis 112 and the track 118.

Each hub cutter blade assembly 156 is fixed to the sprocket hub assembly 116 by a pair of threaded bolts 174 received in threaded holes formed in an associated cylindrical mounting saddle body 171. The holes and bolts 174 are symmetrical with respect to the radial plane of the blade 166. Each of the saddle bodies 171 is permanently welded onto the outer surface of the cylindrical hub portion 138. The hub cutter blade assemblies 156 are equally spaced on the outer periphery of the hub 126, that is, located about 180 degrees apart.

As the sprocket drive assembly 116 turns, the cutting edges 170 of the rotating cutter blade assemblies 156 sweep past the cutting edges 164 of the stationary cutter blade assemblies 154 in a circular path about the axis of rotation 126 of the sprocket drive assembly 116. The various parts are proportioned so that there is a slight clearance of, for example, ⅛ between the respective cutting edges 164, 170. When the rotating cutter blade assemblies 156 pass the stationary cutter blade assemblies 154, any refuse material entrained between the chassis 112 and the sprocket 130, and tending to be wrapped about the hub 126 of the sprocket drive assembly 116, is cut or sheared by the respective cutting edges 164, 170 or is at least scored by such cutting edges 164, 170 if not fully severed. The cut or scored material is, consequently, unable to entwine itself around the sprocket drive assembly 116 and build-up in the cavity formed between the chassis 112 and the sprocket 130.

The rotating cutting edge 170 is substantially spaced from the sprocket 130 and angled toward the opening 172 formed between the chassis 112 and the track 118 so that the debris tends to fall through the opening 172 and prevents the accumulation or build-up of the debris within the cavity formed by the sprocket drive assembly 116, the chassis 112, and the track 118. The rotating cutting edge 170 is preferably spaced from the sprocket 130 a distance greater than ten times the operating clearance between the cutting edges 64, 70. Preferably, at least a portion of the cutting edges 64, 70 are located radially outward from the plane,of separation 146 of the duo-cone seal.

The bolts 174 are selected with reference to their material strength and size so that they break and release a rotating cutter blade assembly 156 in the event that an unusually high cutting force is developed between the rotating and stationary cutter blades. The break away action of the bolts and rotating cutter blade assembly protects the bearings, that support the hub for rotation, from excessive forces. Where the risk of excessive cutting force being developed is negligible or can otherwise be ignored, the rotating cutter blade 166 can be attached to the sprocket hub portion 138 in a permanent manner such as by welding.

It should be evident that this disclosure is by way of example and that various changes may be made by adding, modifying or eliminating details without departing from the fair scope of the teaching contained in this disclosure. The several disclosed embodiments illustrate cutter blades that are bi-directional in that they are arranged to cut material in either rotational direction of the associated wheel or sprocket. Additionally, the various yieldable cutter blades are arranged to be released by tension failure in the bolts retaining them in position at substantially the same force level in either direction of wheel or sprocket rotation. After a yieldable cutter blade is released it or a replacement can be re-installed with new retaining bolts. Other arrangements for holding the yieldable blades in position until a predetermined force level is achieved can be devised; such arrangement can include only one bolt or other release element or several such release elements to retain the yieldable blade. The invention is therefore not limited to particular details of this disclosure except to the extent that the following claims are necessarily so limited.

I claim:

1. A land vehicle having a frame, ground engaging surfaces for supporting the frame for transport over the ground, a power rotated member for driving the ground engaging surfaces in a recirculating path, a member fixed to the frame supporting the power rotated member on the frame, the power rotated member being exposed to the environment in which the vehicle operates such that it exhibits a tendency to drag debris with its external surfaces around its axis of rotation and the supporting member resulting in abrasion of the support member and/or rotating member, a pair of cooperating blades for cutting debris dragged around the support member by the rotating member, a first of said blades being fixed relative to the rotating member and a second of said blades being fixed relative to the support member, a yieldable element securing one of said blades in its fixed relation to its associated member, said yieldable element being constructed and arranged to allow said one blade to move out of its fixed position relative to its associated member when a predetermined excessive cutting force is encountered between said blades to thereby limit the forces developed between the rotating member and support member by the cutting blades.

2. A land vehicle as set forth in claim 1, wherein said yieldable element is a bolt adapted to break when an excessive force is encountered between said blades.

3. A cutter blade for reducing the build-up of material tending to be entrained about the support of an external rotating member of a land vehicle associated with a ground engaging member, the cutter blade being formed of a relatively thick body of steel and having oppositely facing sides terminating in a generally straight cutter edge, the cutter blade having through apertures, the apertures being arranged to receive retaining bolts of predetermined strength, the cutting edge being arranged to cut or score material when cooperating with a mating blade from either of two opposite directions of rotation of the rotating member, the apertures being arranged to permit retaining fasteners to secure the blade with an ultimate retention forces opposed to a force at the cutting edge, that is the same in either direction of rotation.

4. A method of reducing the tendency of material being entrained and accumulated on an external rotary part and/or external surfaces of parts supporting the rotary part of a land vehicle while protecting the bearing supporting the rotary part where the vehicle is arranged to have a pair of cutter blades that include a stationary blade and a rotational blade that rotates in unison with the rotary part in a path concentric with the axis of the rotary part comprising the step of attaching one of the pair of cutter blades on the vehicle with retaining elements that are arranged to release the one cutter blade from its operative position in the event that a cutting force is developed between the pair of cutter blades that would exceed a predetermined capacity of the bearing supporting the rotary part.

* * * * *